United States Patent [19]

Eckels

[11] 4,120,169

[45] Oct. 17, 1978

[54] MULTIPHASIC PUMP FOR ROTATING CRYOGENIC MACHINERY

[75] Inventor: Phillip William Eckels, Pittsburgh, Pa.

[73] Assignee: Electric Power Research Institute, Palo Alto, Calif.

[21] Appl. No.: 750,794

[22] Filed: Dec. 15, 1976

[51] Int. Cl.$^2$ .............................................. F17C 7/02
[52] U.S. Cl. ........................................ 62/55; 417/901
[58] Field of Search ...................... 62/45, 55; 417/901

[56] References Cited

U.S. PATENT DOCUMENTS

| 2,831,325 | 4/1958 | White | 417/901 |
|---|---|---|---|
| 2,888,879 | 6/1959 | Gaarder | 62/55 |
| 2,932,310 | 4/1960 | Koblish | 62/55 |
| 3,379,132 | 4/1968 | Wagner | 417/901 |

*Primary Examiner*—Ronald C. Capossela
*Attorney, Agent, or Firm*—Townsend and Townsend

[57] ABSTRACT

A mixed phase pump for rapidly rotating cryogenic machinery is disclosed, preferably for installation to a superconducting generator rotor. The superconducting generator rotor includes an inner and outer rotor structure joined in a thermally insulated configuration not unlike that of a Dewar flask. The inner rotor contains a support cylinder for a refrigerant, typically helium, which when refrigerated to 3.5° Kelvin at one half a standard atmosphere under the normal rapid rotation of the axially aligned support cylinder, classifies itself into a two-phase liquid gas system. The phases include an outer cylindrical helium pool and an axially inward gaseous core separated by a cylindrical gas-liquid interface. During normal operation of the rapidly revolving rotor, a pump removes the gas for recooling to a liquid state by receiving the gas in the vicinity of the axis of the rotor at an inlet. During abnormal operation including stator short-circuit and rapid rotational vibrational acceleration and deceleration of the rotor, the normal cylindrical interface between the cylindrical helium pool and the vapor core is destroyed. The vapor core in the vicinity of the pump inlet becomes multiphasic and the pump inlet can induct/ingest quantities of liquid. Accordingly, a pump with the liquid gas classification volume located outwardly from the gas inlet to the pump is disclosed. This liquid trap volume in the pump assures that the outward passage of gas only from the pump occurs. Stability of the two-phase gas-liquid system as well as the prevention of thermal stressing of torque-transmitting members of the high speed rotating rotor is prevented.

4 Claims, 4 Drawing Figures

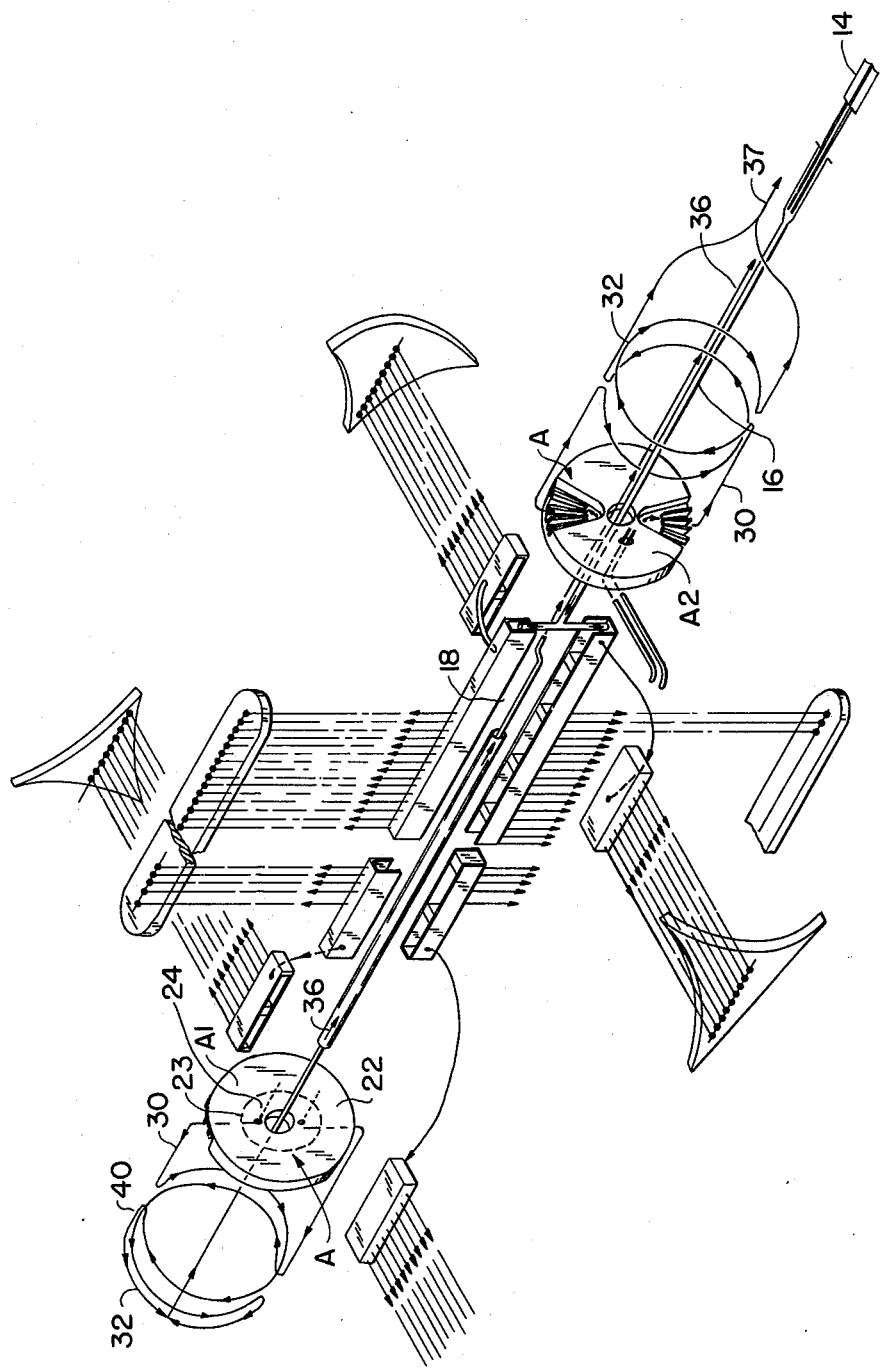
FIG._1.

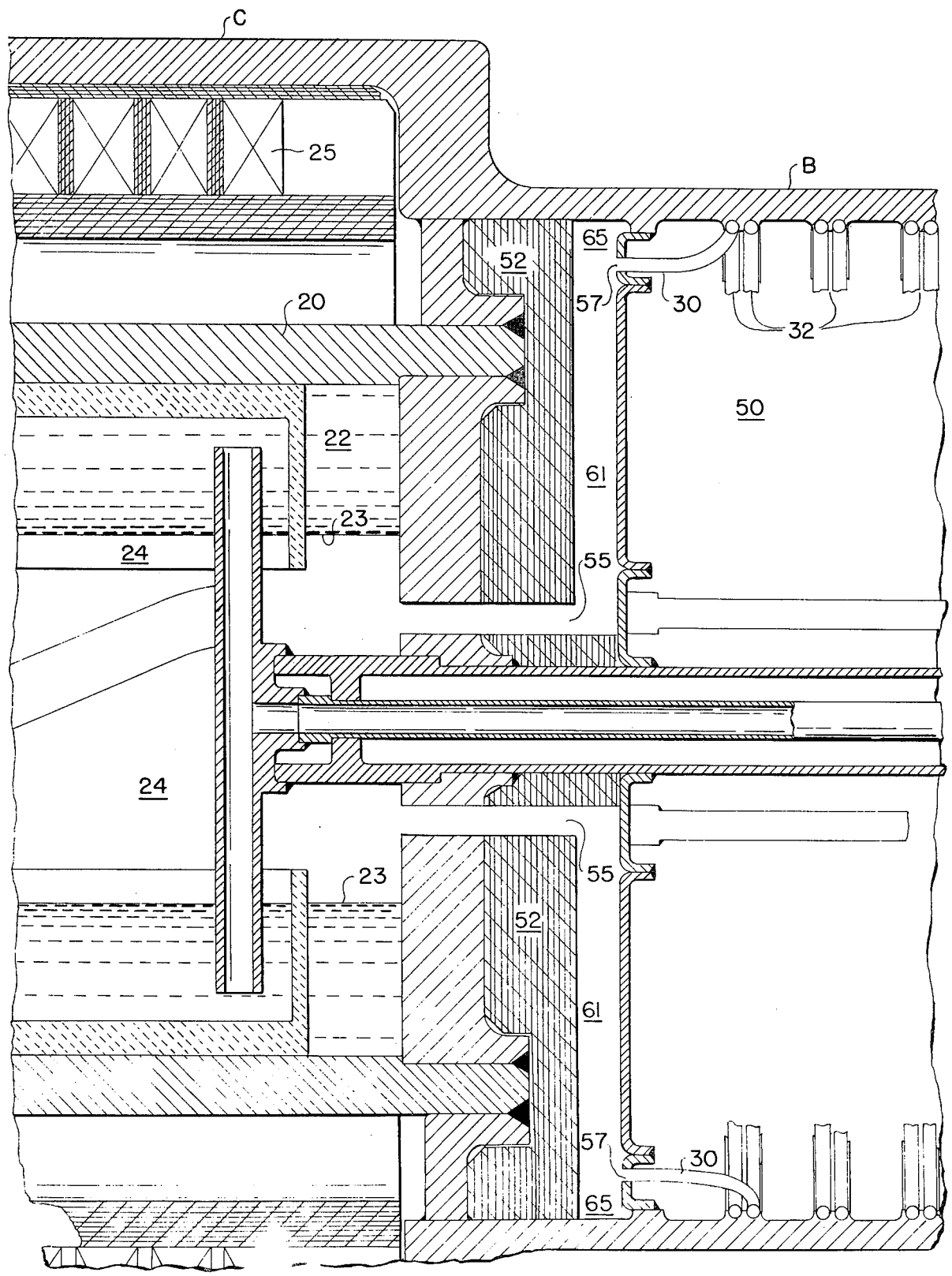
FIG._2.

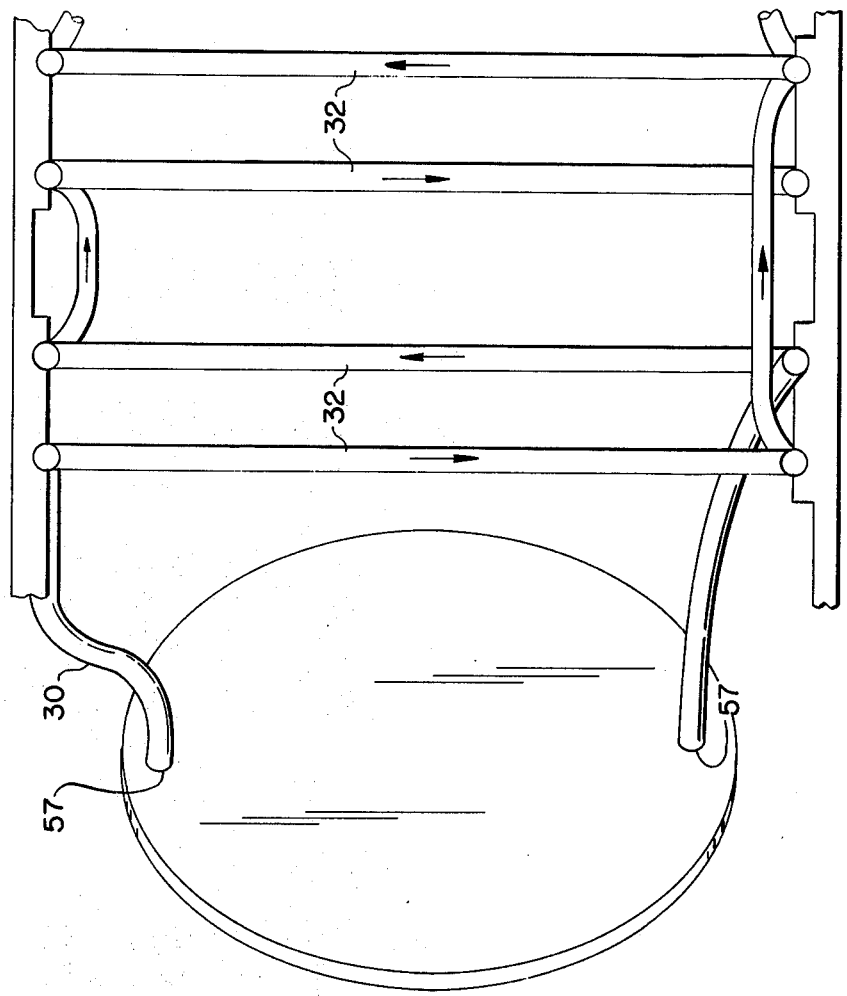
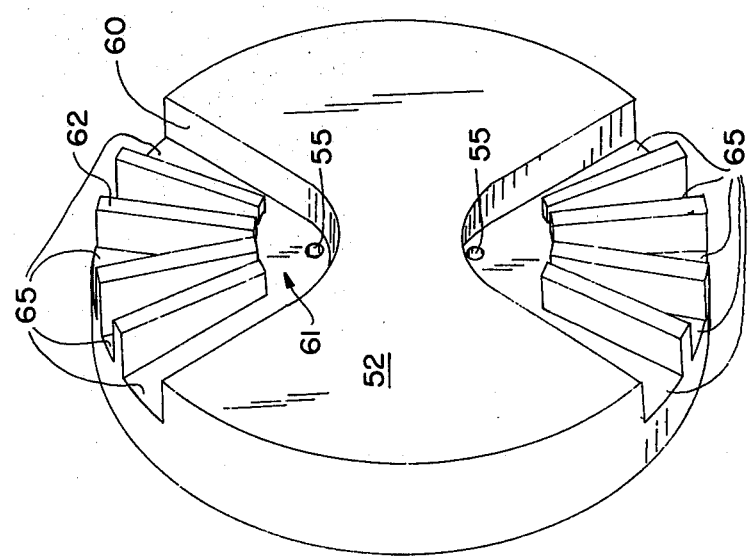
FIG._3.

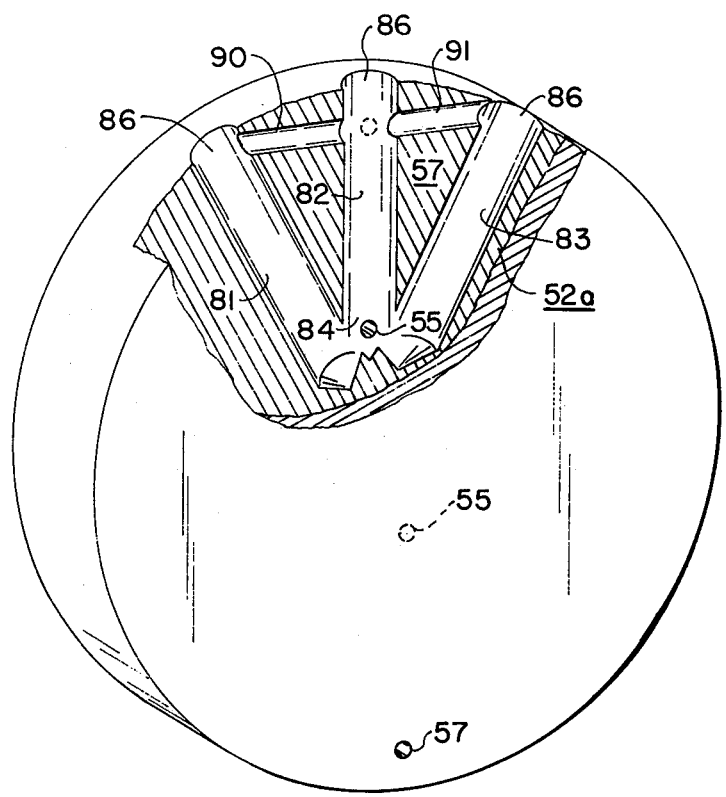
FIG._4.

MULTIPHASIC PUMP FOR ROTATING CRYOGENIC MACHINERY

This invention relates to a multiphasic cryogenic pump for high speed rotating machinery. More particularly, a pump compatible with a super-cooled generator rotor is disclosed.

STATEMENT OF THE PROBLEM

Super-cooled windings in generator rotors are desirable. Specifically, by maintaining the windings of the rotor in a super-cooled state, an increase in generator efficiency of as much as 1% can be realized.

Additionally, super-cooled rotors and generator stators can be built to a much smaller diametric dimension. This includes a reduction in weight of the overall generator. Moreover, where the rotor is constructed to a smaller diameter, there is a resultant reduction of the problems encountered in high-speed rotating rotors.

Super-cooled rotors consist of two separate parts. Outermost there is a damper shield and damper shield support. This damper shield serves the dual purpose of being an outer thermal jacket of the super-cooled rotor as well as preventing back electromotive forces, both electrical and mechanical, from penetrating through to the superconducting coils.

Innermost there is an inner rotor structure including the superconducting windings or coils immersed within a helium refrigerated annulus. This helium refrigerated annulus typically maintains the temperature of the superconducting coils at 4.3° Kelvin or below so that superconductivity takes place. Allowing for the desired temperature drop, the multiphasic system of the helium refrigerated annulus is maintained with a liquid boiling point of 3.5° Kelvin in liquid helium at a pressure of half a standard atmosphere.

When the rotor is on line, the helium bath undergoes rapid rotation. This classifies the multiphasic system in the inner core into an outer cylindrical pool of liquid helium with an inner gaseous core. The liquid-gas interface is cylindrical and symmetrical about the axis of rotation of the generator rotor.

Such generators, however, must be designed not only for their normal operational state, but also for the parametric extremes which they can expect to encounter in abnormal operation. Such an extreme is a short-circuit of the generator stator which produces tremendous changes in and on the rotor.

These changes include rapid angular accelerations imparted to the high speed rotating rotor. These accelerations destroy the cylindrical liquid gas interface. If the helium gas evacuating pump ingests/inducts liquid at the inlet, several undesirable effects can and do occur.

First, the pressure in the helium multiphasic helium bath changes, typically by dropping. Thermal balance of the two phase system is destroyed.

Secondly, the gaseous helium is normally communicated away from the rotor in very carefully spaced helium conduits. These helium conduits are spaced so that the "torque tubes" communicating power to the rapidly rotating generator rotor are maintained with a precise thermal gradient. Since these torque tubes transmit power, rapid change of their thermal state under a stress condition can cause thermal stressing and even failure of such torque tubes.

Where liquid helium carryover would occur to such torque-transmitting sections of a rotor, failure of the rotor at and near the torque tubes could occur. Consequently, liquid helium carryover is to be avoided.

Finally, it is necessary in such super-cooled generator rotors to assure that after they have passed through a stress condition that their departure from a normal operating state is minimized and that their return to a normal operating state is made as rapidly as possible.

SUMMARY OF THE PRIOR ART

Prior art superconducting generator rotors have traditionally relied on a simple radially disposed pipe to pump gaseous helium away from the rotor to the conduits that maintain the torque tube thermal gradient. The end of the pipe nearer the axis of rotation is in direct communication with the gas in the rotor. The end farther from the axis is in direct communication with the torque tube conduits. A pumping action arises from the rotational motion imparted by the pipe to the gas in the pipe. Due to the familiar centrifugal force, this gas is flung outward with the result that the pressure at the end of the pipe that is nearer the axis of rotation is reduced. Thus gas is continuously drawn into the nearer (rotor) end and expelled from the farther (torque tube) end.

However, if the liquid-gas interface in the rotor is upset, as would be the case during any abnormal operation, liquid helium leaves the rotor and is pumped through to the torque tube conduits. The result is to upset the precisely maintained thermal gradient along the torque tube, thereby subjecting the torque tube to thermal stressing and an increased risk of failure.

SUMMARY OF THE INVENTION

A mixed phase pump for rapidly rotating cryogenic machinery is disclosed, preferably for installation to a super-conducting generator rotor. The superconducting generator rotor includes an inner and outer rotor structure joined in a thermally insulated configuration not unlike that of a Dewar flask. The inner rotor contains a support cylinder for a refrigerant, typically helium, which when refrigerated to 3.5° Kelvin at one half a standard atmosphere under the normal rapid rotation of the axially aligned support cylinder, classifies itself into a two-phase liquid gas system. The phases include an outer cylindrical helium pool and an axially inward gaseous core separated by a cylindrical gas-liquid interface. During normal operation of the rapidly revolving rotor, a pump removes the gas for recooling to a liquid state by receiving the gas in the vicinity of the axis of the rotor at an inlet. During abnormal operation including stator short-circuit and rapid rotational vibrational acceleration and deceleration of the rotor, the normal cylindrical interface between the cylindrical helium pool and the vapor core is destroyed. The vapor core in the vicinity of the pump inlet becomes multiphasic and the pump inlet can ingest or receive or induct quantities of liquid. Accordingly, a pump with the liquid-gas classification volume located outwardly from the gas inlet to the pump and a large flowing classification volume between inlet and outlet is disclosed. This liquid trap volume in the pump assures that the outward passage of gas only from the pump occurs. Stability of the two-phase gas-liquid system as well as the prevention of thermal stressing of torque-transmitting members of the high speed rotating rotor is prevented.

OTHER OBJECTS AND ADVANTAGES

An object of this invention is to disclose a rotor cryogenic pump for evacuating gas, which pump can be multiphasic in a rotor stress condition. According to this aspect of the invention a pump is provided with an inlet adjacent the rotor axis and an outlet adjacent the rotor periphery. Between the inlet and outlet there is provided at least one down-coming passageway which allows the centrifugal force of the rotor to pump gas from pump inlet to outlet. A liquid trap is provided at the periphery of the pump radially outward from the pump outlet. Where the pump inlet sees a multiphasic condition, the pump serves to separate and trap quantities of liquid which would otherwise destroy the thermal equilibrium of the rotor.

An advantage of the pump herein disclosed is that the pressure of a two-phase system is maintained. The pump does not draw down the cylindrical volume pressure to destroy the design temperatures of the two-phase gas-liquid system.

A further advantage of this invention is that carryover of liquid to torque transmitting parts of the rotor is avoided. By avoiding such liquid carryover, the thermal gradient in such torque transmitting parts in maintained substantially unchanged. Thermal stressing and even failure of generator torque tubes is avoided.

Yet another advantage of this invention is that a rapid return of the rotor to a normal generator operating state is assured. Moreover, any departure of the rotor from a normal operating state during a stress condition is kept to a minimum.

Other objects, features and advantages of this invention will become more apparent after referring to the following specification and attached drawings in which:

FIG. 1 is a perspective view of the helium flow circuit of a super-cooled generator rotor;

FIG. 2 is a cross-section of the rotor adjacent the torque tube illustrating the helium support center, helium pool, vapor core, and pump of this invention, the pump being shown in section;

FIG. 3 is a view partially in perspective illustrating one embodiment of the pump and its communication of gaseous helium to the torque tube of the generator rotor; and, FIG. 4 is a sectional view of an alternate embodiment of the pump of this invention.

DETAILED DESCRIPTION OF THE DRAWINGS

Referring to FIG. 1, the perspective view of the helium flow circuit of the super-cooled generator rotor is illustrated. Typically, helium is transferred to the rapidly rotating rotor through a rotating helium transfer system 14 such as that shown and described in the Institute of Electrical and Electronic Engineers' Paper No. C 73-255-7 entitled "Development of a 5MVA Superconducting Generator, Mechanical and Cryogenic Design", by T. J. Fagen et al. Helium flows along an inlet passage 16 coaxial with the rotor, which terminates in a conventional "T" feed tube 18. Tube 18 communicates interiorly of a helium management support cylinder 20 (see FIG. 2), which cylinder is not shown in the schematic view of FIG. 1. Liquid helium communicated from transfer system 14 through conduit 16 to "T" feed 18 forms a multiphasic liquid-gas two-phase system.

As can be seen in FIG. 2, a cylindrical liquid helium pool 22 is formed with an inner gaseous helium core 24. Between the respective pool and gaseous core, there is located a cylindrical helium interface 23.

The interior of the rotor includes numerous heat exchangers. The function of these heat exchangers is to communicate liquid helium at 3.5° Kelvin under half an atmosphere of pressure in the vicinity of the generator windings 25. As the windings and heat exchangers do not constitute the point of novelty of this invention, they will not hereinafter be described with particularity.

Once the helium cools the windings, the latent heat of evaporation taken from the windings causes the helium to become gaseous. This gas is communicated to gaseous core 24 of the two-phase system.

In core 24, gas typically outflows through pump A. It is classified in pump A and then passes through an outlet conduit 30 to a torque tube coolant manifold 32.

It should be appreciated that pumps $A_1$ and $A_2$ are located at each end of the rotor. Pump $A_1$ and the manifold 32 (FIG. 1) communicated thereto cool a torque-transmitting torque tube B (FIG. 2). The manifold 32 discharges concentrically of the rotor in an outlet conduit 36 extending through the gaseous core. Pump $A_2$ typically is located at the non-torque transmitting tube communicated to the rotor. Its manifolds 32 communicate to a helium outlet 37. Outlets 36 and 37 discharge to refrigerating machinery (not shown).

Having set forth the configuration flow of the helium, attention can now be devoted to the section of an actual rotor with respect to FIG. 2.

Referring to FIG. 2, a generator supported by rotating bearing not shown is illustrated in section between a torque tube B and a rotor section C. Torque tube B defines interiorly thereof a vacuum chamber 50 having spaced helium gas outlets 32. Torque tube B immediately adjacent the rotor C includes a pump blank 52. (See FIGS. 2 and 3.) Blank 52 has paired helium inlets 55 and paired helium outlets 57. Typically, blank 52 includes milled semi-arcuate walls 60 which define cavities 61 within each of which is located a plurality of spaced radial vanes 62. In normal operation, gaseous helium from core 24 flows through inlets 55. Once the gas is through inlets 55, the rotation of the rotor (commonly rotating in the range of 3600 rpm) expels the gas outwardly under centrifugal force. The gas, once expelled, passes through conduit 57 and then into outlet 30 and the communicated torque tube manifolds 32. Torque tube manifolds 32 are precisely designed and spaced for preserving a carefully chosen temperature gradient along the length of the torque tube. By maintaining this carefully chosen temperature gradient, the torque tube has sufficient strength to support the weight of the inner rotor to withstand the forces of rapid rotation, and at the same time to transmit the necessary torque for the rotor to rotate.

It is to be carefully noted that outlets 57 are spaced radially inward from the radially outermost periphery of the cavity 61 (which periphery corresponds, in the embodiment shown, to the periphery of the pump blank 52 where it contacts the interior of the torque tube B). Thus a liquid helium storage volume 65 is defined between the radially outermost periphery of the cavity 61 and the outlets 57 of the pump.

Assuming that the rotor was being subject to the stress of the multiphasic condition previously described, and assuming that the liquid helium interface 23 is broken down, some entry of liquid helium into conduits 55 can be anticipated. In entering into conduits 55, liquid segments of helium pass outwardly between the "downcoming" vanes. In such passage they fall outwardly to and are contained within the helium storage volume 65.

Helium outlet 57, nevertheless, will typically see a gaseous flow. This is because the liquid will be centrifugally classified out in the pump blank 52 to the volume 65.

As it is normally expected that the generator stress condition will only last for a relatively short interval of time, the condition of liquid helium outflow at inlet 55 will be relatively short lived. Accumulated helium within the liquid helium storage volume 65 will thereafter boil off. It will pass outwardly of the pump blank at outlet 57 in the desired gaseous state.

Referring to FIG. 4, an alternate embodiment of the pump blank 52a is shown. The pump blank includes an inlet 55 and an outlet 57.

Three paired spaces are each defined by drilling in the radially extending blank three apertures 81, 82 and 83. These apertures diverge from each other at an approximate angle of 25° and intersect it at a common communicating area 84 in the vicinity of inlet 55. Respective passageways 81, 83 are carried to a radial depth which exceeds the depth of central passageway 82. At the outer portion, the passageways are communicated by cross conduits 90, 91. These conduits are likewise drilled. Typically, the open ends of the respective bores 81-83 are sealed as by welding of the blank.

In operation, the functioning of the pump blank 52a is precisely the same; gaseous helium inflows from an inlet 55 and outflows through an outlet 57. Liquid helium is accumulated in the storage space 86. When such liquid helium boils off from the storage space 86, it outflows through outlet 57 and the connected piping as heretofore described.

It should be appreciated that the pump according to FIG. 4 is easier to fabricate. For this reason, the pump blank of FIG. 4 is preferred.

What is claimed is:

1. A mixed phase pump for rapidly rotating cryogenic machinery which machinery includes a rapidly rotating support cylinder rotated substantially about its axis containing a two-phase liquid-gas refrigerant with said liquid normally classified to the periphery of said support cylinder to define a cylindrical pool and said gas classified to the interior of the refrigerant to define a gaseous refrigerant core with a cylindrical liquid gas interface therebetween, said support cylinder including said pump for withdrawing gaseous refrigerant from said pool, and means for communicating liquid refrigerant to said pool, said pump comprising: a pump housing, said pump housing rotatable about an axis substantially coincident to the axis of said refrigerant support cylinder; said pump housing defining at least one passageway extending from a first end adjacent the axis of rotation of said pump housing to an opposite end radially remote from the axis of rotation of said pump housing; a gaseous helium inlet communicated to said gaseous refrigerant core at one end and to said axially adjacent portion of said passageway at the opposite end to provide for the inflow of gaseous refrigerant from said core to said pump; a gaseous refrigerant outlet removed axially outward from said inlet, said outlet communicating to said pump passageway at a distance less than the full radially outward distance of said passageway to permit the outflow of helium gas from said pump; and, said passageway defining between said outlet and the axially remote portion of said passage a liquid refrigerant storage volume to prevent liquid that penetrates in said inlet from gaining access to said pump outlet.

2. The invention of claim 1 and wherein said passageway is divided by spaces vanes interrupting a portion but not all of said passageway.

3. The invention of claim 1 and including a plurality of passageways, said passageways communicated adjacent the outlet end in the vicinity of said helium storage area.

4. The invention of claim 1 and wherein said pump blank rotates at the same velocity as the helium support cylinder and coaxially therewith.

* * * * *